Dec. 29, 1964      A. A. SHOUP      3,163,103
ROTISSERIE

Filed Oct. 22, 1962      3 Sheets-Sheet 1

INVENTOR.
ALLEN A. SHOUP
BY
Howard M Herriot
ATTY.

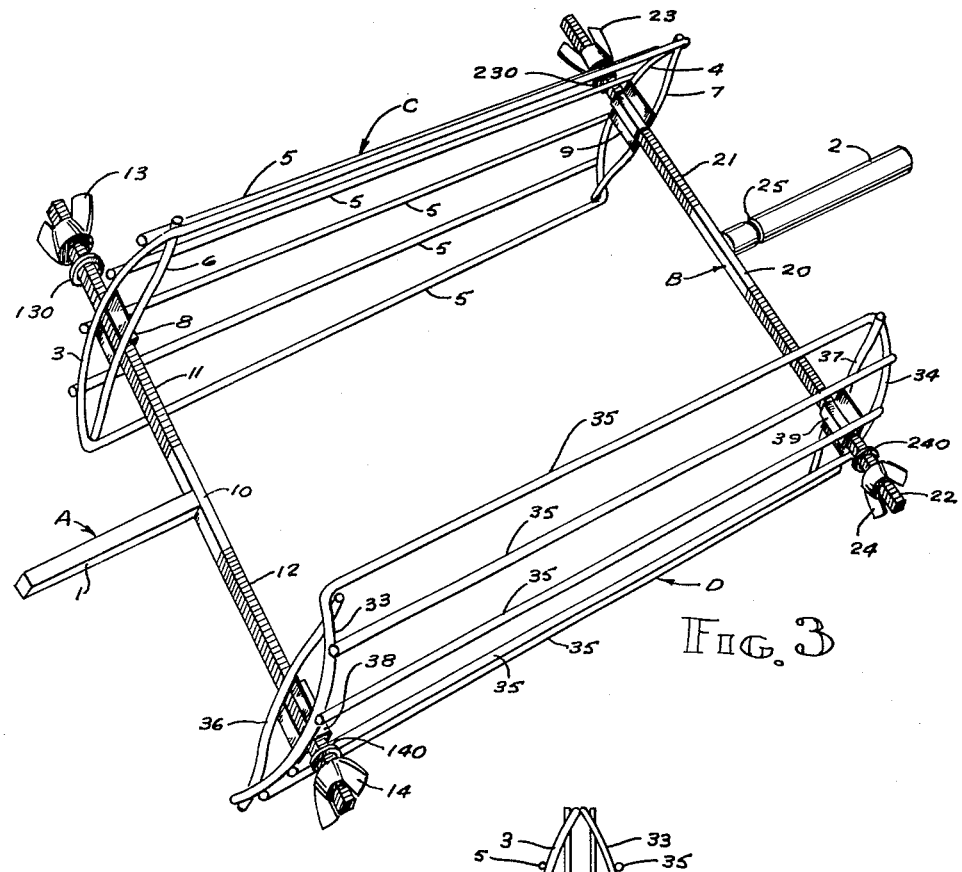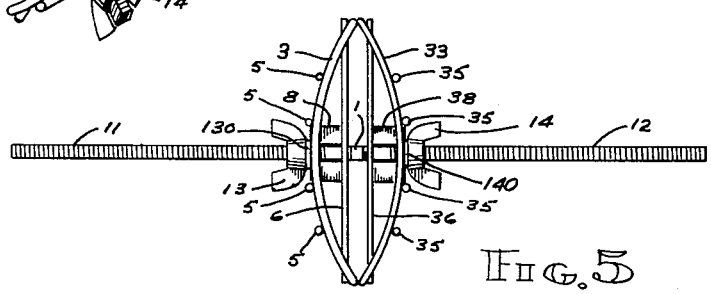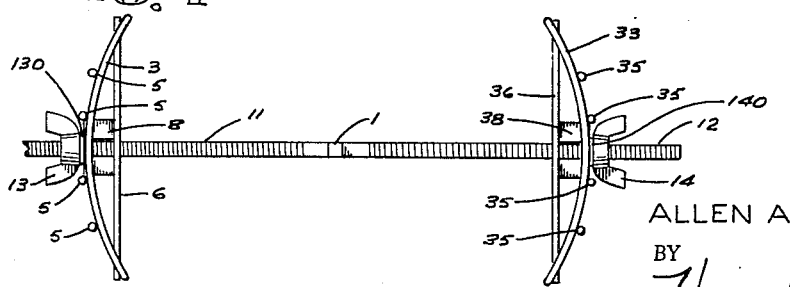

Dec. 29, 1964
A. A. SHOUP
3,163,103
ROTISSERIE
Filed Oct. 22, 1962
3 Sheets-Sheet 3
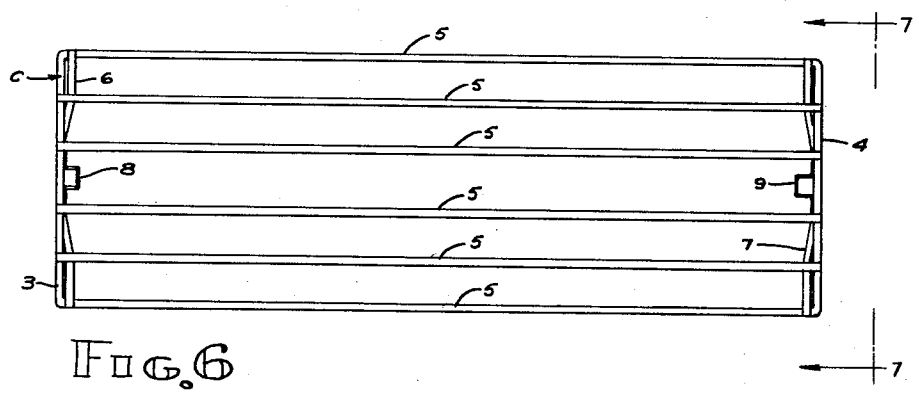
Fig. 6
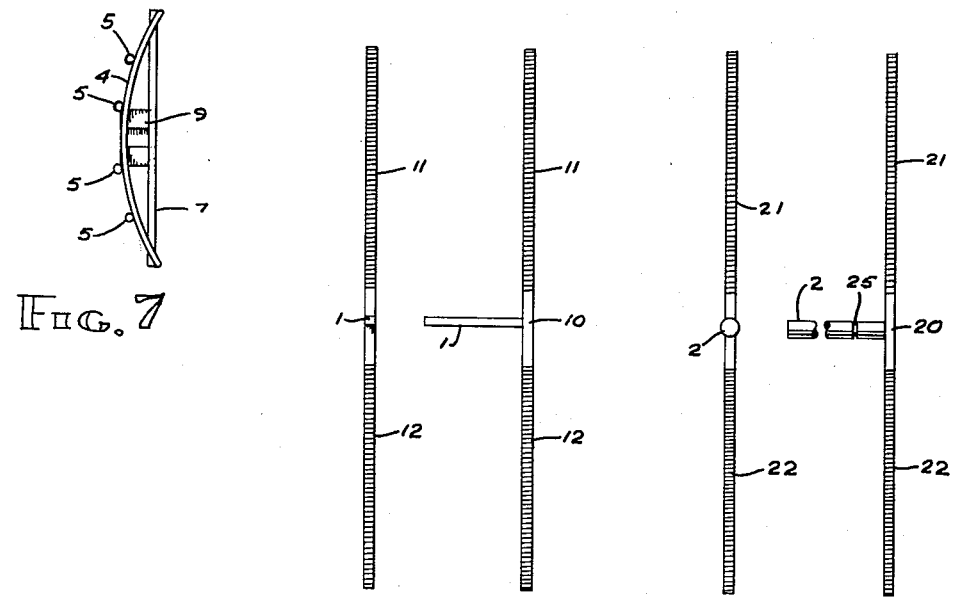
Fig. 7    Fig. 8    Fig. 9    Fig. 11    Fig. 12
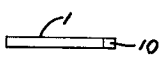    
Fig. 10    Fig. 13
INVENTOR.
ALLEN A. SHOUP
BY
Howard M. Herriot
ATTY.

3,163,103
ROTISSERIE
Allen A. Shoup, Janesville, Wis.
(% Shoup Engineering Corp., East Troy, Wis.)
Filed Oct. 22, 1962, Ser. No. 231,942
1 Claim. (Cl. 99—427)

This invention relates to an improved spit or rotisserie.

Spits are known wherein a spike or sharp pointed rod pierces the center of the meat or other food to be rotated over the heat source. Piercing the meat causes loss of juices.

Other spits are known wherein a bird, such as a turkey or duck, is clamped between its breast and its back.

These known spits do not confine bird wings and legs against flopping out and dragging, and consequently an extra effort is required such as tying or pinning together of the wings and legs. Even with the extra work of tying or pinning, some portion often comes loose and the cooking thus becomes troublesome.

This invention overcomes these disadvantages and provides a greatly improved food clamping means for a rotisserie or spit.

An object of this invention is to provide an improved rotisserie device including means for conveniently and securely clamping the meat or other food to be cooked.

It is another object to provide such clamping means for clamping securely in all the legs and wings of a bird to be cooked.

A still further object is to provide such a clamping means which is quickly and easily adjustable in size for clamping various sizes of objects to be cooked.

These and other objects and advantages are effected by this invention as will be apparent from the following description, when read in conjunction with the accompanying drawings, wherein:

FIG. 3 is a perspective view of the food clamping apparatus portion of the device shown in FIG. 1;

FIG. 4 is an end elevational view of the apparatus shown in FIG. 3, the apparatus being shown adjusted to its maximum clamping size;

FIG. 5 is another end elevational view of this same apparatus, but shown adjusted to its minimum clamping size;

FIG. 6 is a plan view of a clamping member of said apparatus;

FIG. 7 is an end elevational view of said clamping member shown in FIG. 6;

FIG. 8 is an end elevational view of the forward end member of the apparatus shown in FIGS. 3, 4 and 5;

FIG. 9 is a plan view of the member shown in FIG. 8;

FIG. 10 is a side elevational view thereof;

FIG. 11 is an end elevational view of the rearward end member of the apparatus shown in FIGS. 3, 4 and 5;

FIG. 12 is a plan view of the member shown in FIG. 11; and

FIG. 13 is a side elevational view thereof.

Figure 1:
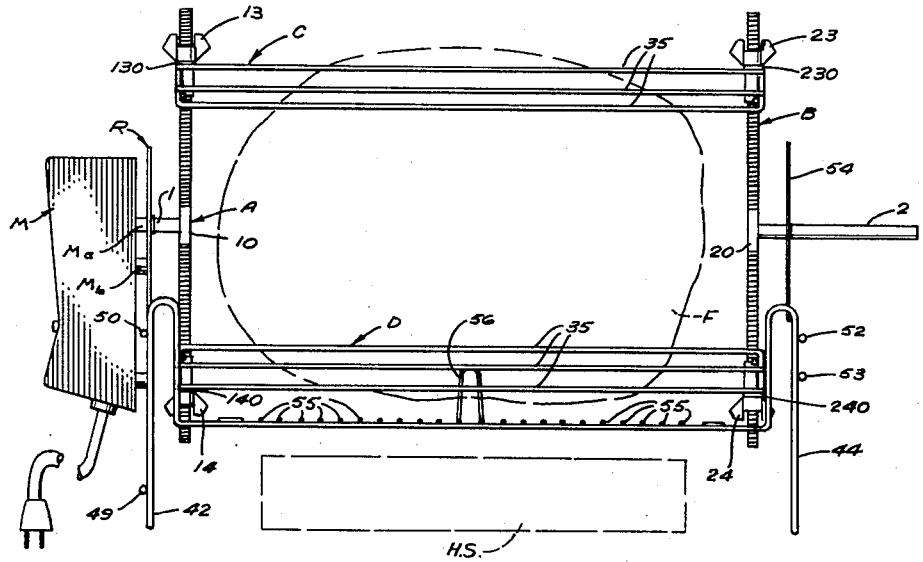
FIG. 1 is a side elevational view of a rotisserie device embodying the invention.

Referring to the drawings, there is shown, in FIG. 1, a rack support R which supports an electric motor M, and together with the motor, supports a food clamping apparatus rotated over a heat source which can be HS.

Figure 2:
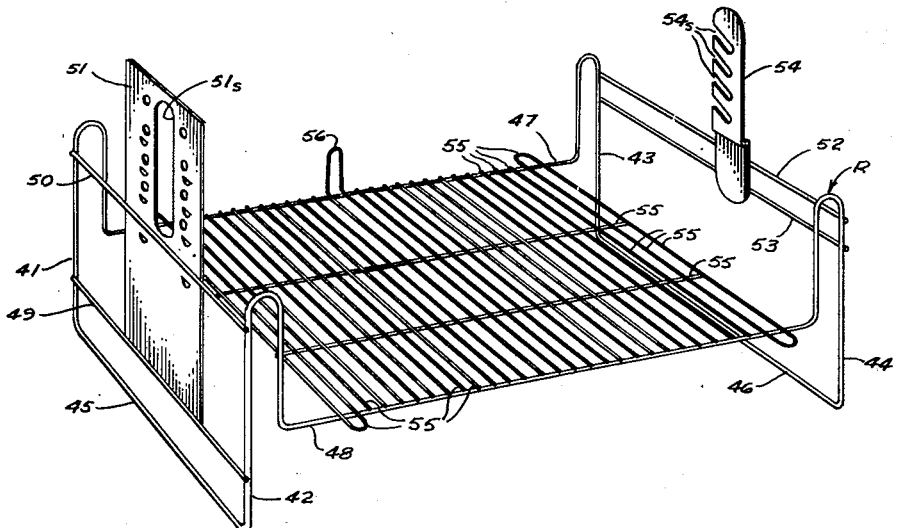
FIG. 2 is a perspective view of the rack support portion of the device shown in FIG. 1.

The rack support R is shown in perspective to FIG. 2. It may be dimensioned to fit over an electric broiler such as the one described in my copending United States application for patent, S. N. 88,868, filed February 13, 1961, or over any other heat source suitable for rotisserie cooking. The rack support R is constructed primarily of wire, a main piece of which is bent to form upright corner pieces 41, 42, 43, 44, horizontal end rests 45, 46, and horizontal side rails 47, 48. Horizontal end braces 49, 50 join uprights 41, 42, and support the motor support adjustment plate 51. Horizontal end braces 52, 53 join uprights 43, 44 and support the shaft support adjustment bracket 54. Grid pieces 55, extending across rails 47, 48 form a horizontal grid which prevents a person's hands from contacting the heat source which is located below this grid.

The adjustable food clamping apparatus is shown in FIGS. 3 through 13.

Referring in particular to FIG. 3, it is seen that the four main components of this apparatus are a T-shaped forward end member A, a T-shaped rearward end member B, a first clamp member C, and a second clamp member D.

The stem element of T-shaped forward end member A is a shaft 1 of polygonal cross section which is adapted to fit into a matching polygonal bore in motor M. The cross element 10 of member A is a rod having a first half-portion 11 and a second half-portion 12, each of equal length, and each threaded as shown.

The T-shaped rearward end member B has a round stem-element or shaft 2, and a cross element 20 having a first half-portion 21 and a second half-portion 22, each of equal length and each threaded as shown. The round shaft 2 has a groove 25 therein for resting in bracket 54 in any of the slots 54S therein.

The shafts 1 and 2 are coaxially aligned and extend outwardly, away from each other and the food held in clamps C and D. The cross elements 10 and 20 are disposed parallel to each other, as is seen in FIGS. 1 and 3. The portions 11, 12 and 21, 22 of cross elements 10 and 20 receive wing nuts 13, 14 and 23, 24, and associated lock washers 130, 140 and 230, 240.

The clamp members C and D are carried by the cross elements and are slidably movable therealong to adjust to positions for clamping all different sizes of meats or other foods from a minimum size such as is illustrated in FIG. 5 to a maximum size such as is illustrated in FIG. 4.

Clamp C is an open, or perforate, semi-tubular structure formed of curved end pieces 3 and 4 joined by longitudinal rails 5. Straight end pieces 6 and 7 join the ends of curved pieces 3 and 4 respectively. At the opposite ends of clamp C, on the curved and straight end pieces, are mounted sleeves 8 and 9, respectively, for slidably receiving the cross element portions 11 and 12, respectively.

Clamp D also is an open, or perforate, semi-tubular structure formed of curved end pieces 33 and 34 joined by longitudinal rails 35. Straight end pieces 36 and 37 join the ends of curved pieces 33 and 34, respectively. At the opposite ends of clamp D, on the curved and straight end pieces, are mounted sleeves 38 and 39, respectively, for slidably receiving the cross element portions 21 and 22, respectively.

To have the food rotated as close to the heat source as possible, the shafts 1 and 2 are supported at higher and lower places, respectively, for larger and smaller pieces of food, respectively, clamped into the apparatus. For example, in the case of the largest piece of food, shaft 2 will be placed in the uppermost slot 54s in bracket 54, and shaft 1, which passes through slot 51s and in plate 51, will be placed in its uppermost position on plate 51. Motor M has projections Ma and Mb matching the circular and semi-circular openings in plate 51, to enable vertical adjustment of the motor on the plate.

The slots 54s in bracket 54, and the slots 51s in plate 51, are located above the midpoint of the space between side rails 47, 48.

The half-portions 11, 12 and 21, 22 of the cross elements 10 and 20 must be no longer than the distance from the lowermost journal point to a side rail 47 and 48. This is to insure that the apparatus will rotate freely without the cross elements touching or being blocked by side rails 47, 48. As a practical matter, for practical sizes, and in the device shown, the cross elements 10 and 20 can be just slightly greater in length than the perpendicular distance between parallel rails 47 and 48.

Also, to prevent touching or blocking, the protective grid formed by pieces 55 must not be located in the rotative path of cross elements 10 and 20. In the device shown, the grid is over the central area of the rack, and does not continue to the ends thereof, leaving openings at each end for the cross elements to rotate through.

Rotisserie cooking has become very popular in recent years. The invention provides convenience and efficiency in handling large items and small items to be cooked. For a large turkey, chicken or other fowl, the bird is placed in the center of the device between the two clamps with one clamp enclosing a leg and wing on one side and the other clamp enclosing the leg and wing on the other side. The middle of the breast, and the middle of the back, are thus not covered by either clamp. The wing nuts are turned so that the bird is centered and is tight within the clamps. The apparatus is placed in the height position which will place the bird as close as possible to the heat without rubbing the grid. All wing nuts should be tightened uniformly to have the bird centered and balanced.

The same procedure is applicable for a smaller bird.

Or, if desired, a plurality of small chickens or other fowl may be placed in the device at right angles to the placement just described above.

Roasts or other cuts may be handled in the same ways as described above the birds.

The invention provides means insuring that each cross member is prevented from turning within its sleeve. This prevents its stem (shaft) from tipping up out of the shaft's journal support. Note that cross member 20, for example, is polygonal in cross section and of such size as to be unable to rotate in sleeves 9 and 39, and this prevents shaft 2 from tipping up and riding out of its support journal slot 54s as it is tendency and as it otherwise would do.

The invention, because of the clamping arrangement, provides the advantage of not having to drive a spit spike through a bone or other hard or tough element of a roast or other food to be cooked, and provides the advantage of having securely held in place any pieces of the food which break off or separate from the main piece during cooking and which, but for this feature, would drop off or drag.

The threaded cross members and wing nut arrangement provides convenient means for tightening adjustments, necessary because of shrinkage, etc., during cooking. This feature permits the adjustments to be made while the food is rotating, without need to stop rotation. This is highly advantageous in that stopping rotation always causes a loss of juice from meats being cooked, especially turkeys.

Although only a preferred form of the invention has been shown and described, various modifications therein can be made without departing from the scope of the invention, which is claimed as follows.

I claim:

A rotisserie device comprising:

a forward T-shaped end member having a stem element of polygonal cross-section and a cross element, the cross element having a first portion on one side of said stem element and a second portion on the other side of said stem element;

a rearward T-shaped end member having a cylindrical stem element and a cross element, the cross element having a first portion on one side of said stem element and a second portion on the other side of said stem element;

said end members being spaced apart, the stem elements thereof being in axial alignment and projecting away from each other, and the cross elements thereof being parallel to each other and being of polygonal cross-section and threaded, and each cross element portion being of equal length;

first and second perforate semi-tubular clamp members extending longitudinally parallel to the axis of said stem elements and each having at each end thereof a sleeve of polygonal cross-section matching that of said cross elements for slidably receiving a portion of one of said cross elements to permit sliding movement therethrough but prevent rotation therein, said first clamp member mounted on said first portions of said cross elements for movement inward and outward thereon, said second clamp member mounted on said second portions of said cross elements for movement inward and outward thereon, each of said cross element portions having threaded thereon outwardly of said clamp members a nut for positioning and retaining said clamp members thereon;

a rack supporting said stem elements to permit rotation of said end members and clamp members as a unit about the axis of said stem elements, said rack having a grid disposed in a horizontal plane below said clamp members and between said end members, the sides of said grid being parallel to said stem elements;

said rack having a plurality of vertically aligned support journals for each of said stem elements, the support journals for said cylindrical stem element of said rearward end member being formed by a series of inclined slots in a vertical bracket plate and being aligned above the midpoint between the sides of said grid, the lowermost one of said support journals being disposed above said grid midway between the sides thereof at a distance from each side of slightly more than the length of a cross element portion;

said cylindrical stem element of said rearward end member having an annular groove therein for receiving said bracket plate when said cylindrical stem element is journaled in one of said slots;

and said cross element portions each being of a length slightly less than the distance from said lowermost journal to the sides of said grid and of a length nearly one-half the perpendicular distance across the sides of said grid.

References Cited by the Examiner

UNITED STATES PATENTS

| | | | |
|---|---|---|---|
| 1,359,749 | 11/20 | Schey | 99—427 |
| 2,600,760 | 6/52 | Guffey | 99—346 X |
| 2,747,497 | 6/56 | Brown | 99—427 |
| 2,847,932 | 8/58 | More | 99—446 |
| 2,938,450 | 5/60 | Carpenter et al. | 99—427 |
| 2,983,218 | 5/61 | Persinger et al. | 99—427 |
| 3,025,783 | 3/62 | Coudek | 99—427 X |
| 3,084,618 | 4/63 | Dieterich | 99—427 |

FOREIGN PATENTS 1,133,918  11/56  France.

OTHER REFERENCES

"U.S.P." (Union Steel Products Co. advertisement), Consumer Products Division, Albion, Michigan (Hi-Lo Rotisserie). (Received in Patent Office July 8, 1957.)

ROBERT E. PULFREY, *Primary Examiner.*

JEROME SCHNALL, *Examiner.*